United States Patent [19]
Carbonaro

[11] Patent Number: 5,806,693
[45] Date of Patent: Sep. 15, 1998

[54] ORGANIZER APPARATUS

[75] Inventor: Gregory Carbonaro, East Islip, N.Y.

[73] Assignee: Kantek, Inc., East Rockaway, N.Y.

[21] Appl. No.: 815,715

[22] Filed: Mar. 12, 1997

[51] Int. Cl.$^6$ ..................................................... A47F 5/00
[52] U.S. Cl. ........................ 211/96; 211/169; 248/205.3
[58] Field of Search ..................... 211/168, 169, 211/96, 59.1; 248/205.3, 918

[56] References Cited

U.S. PATENT DOCUMENTS

| | | | |
|---|---|---|---|
| D. 336,197 | 6/1993 | Wilcox | D6/570 |
| 3,195,736 | 7/1965 | Bomar | 211/169 X |
| 3,337,059 | 8/1967 | Le Hoy | 211/169 X |
| 3,924,749 | 12/1975 | Weston | 211/169 X |
| 4,747,572 | 5/1988 | Weber | 248/442.2 |
| 5,022,537 | 6/1991 | Henriquez | 211/510 |
| 5,101,987 | 4/1992 | Twedt | 211/55 |
| 5,104,087 | 4/1992 | Wentzloff et al. | 248/442.2 |
| 5,104,088 | 4/1992 | Bakanowsky, III | 248/442.2 |
| 5,122,941 | 6/1992 | Gross et al. | 362/276 |
| 5,292,099 | 3/1994 | Isham et al. | 248/442.2 |
| 5,398,905 | 3/1995 | Hinson | 248/442.2 |
| 5,595,309 | 1/1997 | Bauer et al. | 211/59.1 |
| 5,615,854 | 4/1997 | Nomura et al. | 248/205.3 X |
| 5,687,945 | 11/1997 | Lee | 248/918 X |

*Primary Examiner*—Robert W. Gibson, Jr.
*Attorney, Agent, or Firm*—Schweitzer Cornman Gross & Bondell LLP

[57] ABSTRACT

An organizer apparatus has first and second panels, each having at least one face for mounting discreet display and storage elements, such as clips, cups, brackets and the like thereon. An arm assembly pivotally joins the panels. The first panel may be mounted upon a surface, such as the side wall of a computer monitor. The faces upon which the display and storage elements are mounted are provided with an array of mounting means which allow the display and storage elements to be chosen and positioned as desired, providing an organizer of great flexibility and adaptability.

8 Claims, 4 Drawing Sheets

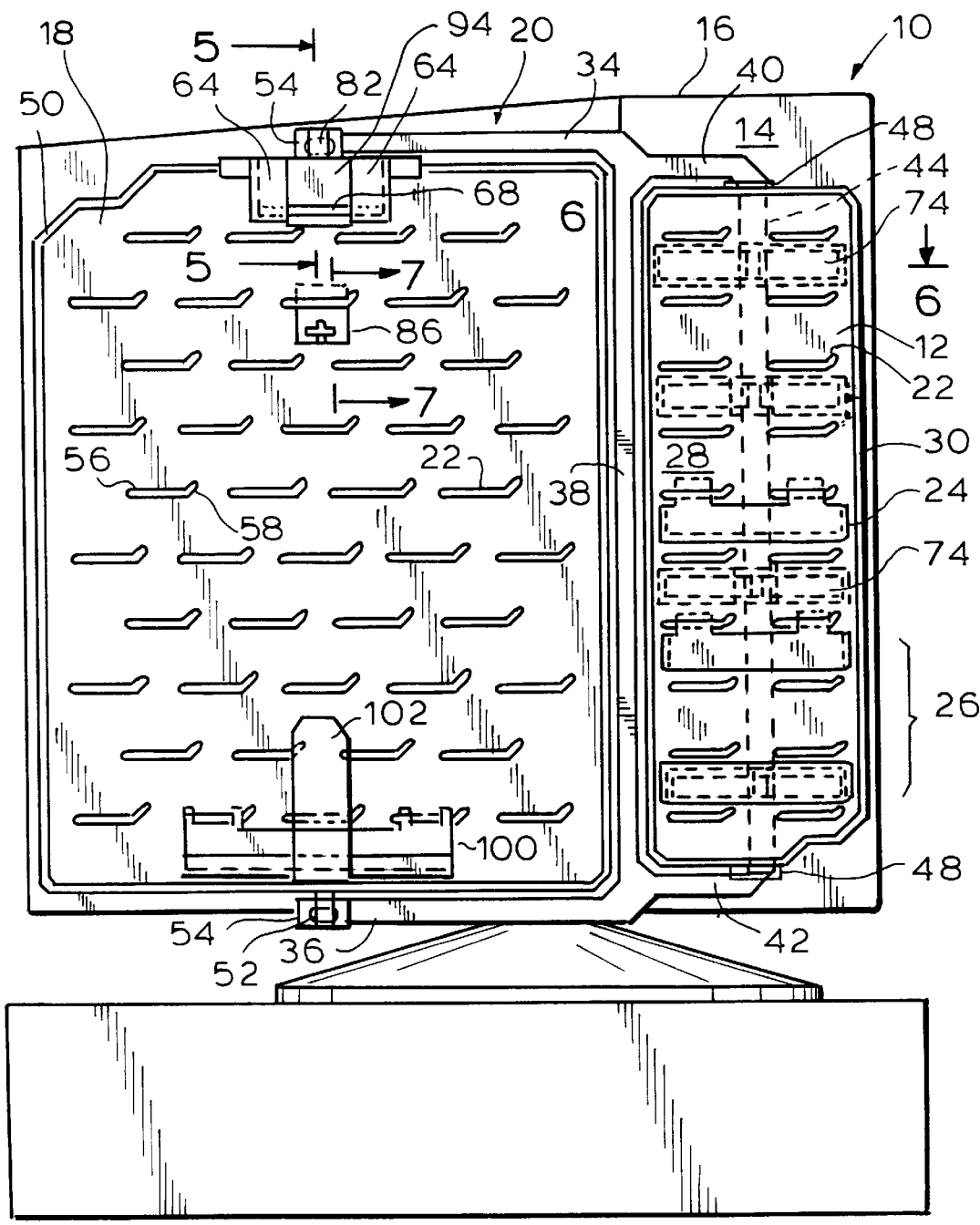
F I G. 1

FIG. 2
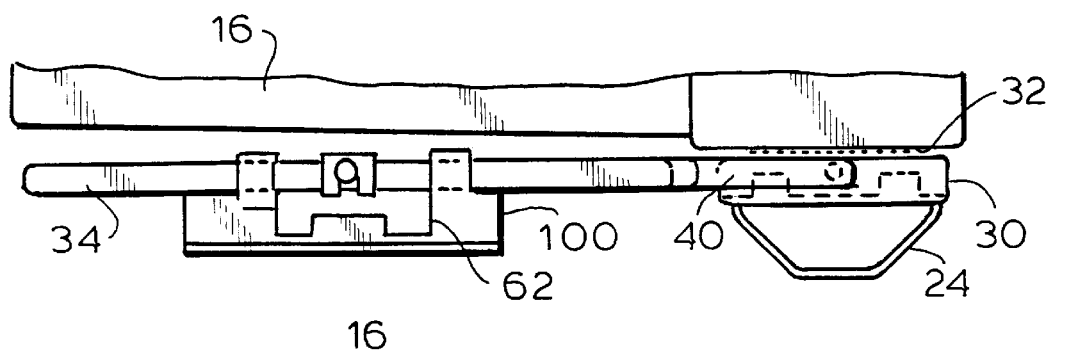
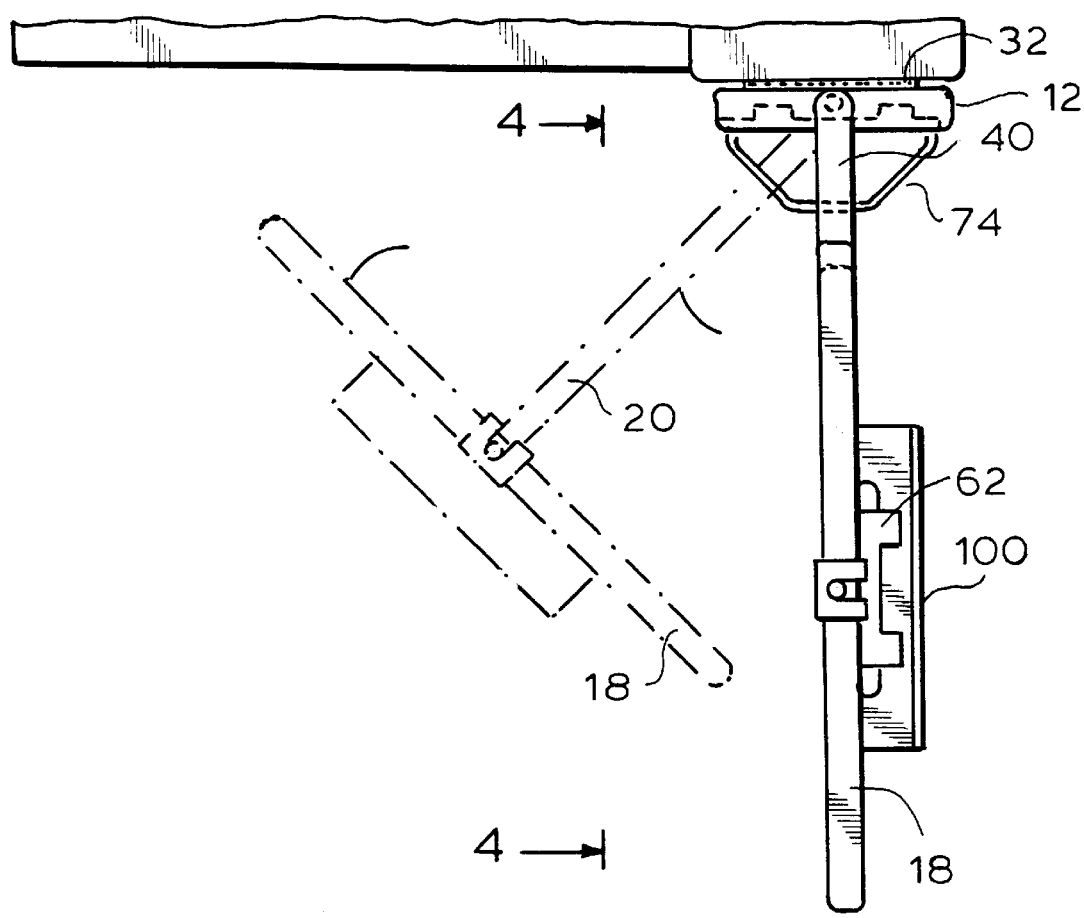
FIG. 3

ORGANIZER APPARATUS

The present invention relates to a new and improved organizer apparatus, particularly adapted for use in connection with computer systems and particularly a monitor therefor.

BACKGROUND OF THE INVENTION

The use of personal computers, both for individual and business use, is well known. Often, the use of a personal computer system is accompanied by an increase in the degree of clutter associated with the workspace surrounding the computer. The user often finds that space previously allocated to other materials has been appropriated by the elements of the computer system, forcing the user to relocate sundry items. In addition, the use of a computer often brings with it additional clutter, in the form of notes, diskettes, and the like.

It is accordingly a purpose of the present invention to provide a storage and organizer device which may be used in a business or home environment to display and store a variety of small items.

Yet another purpose of the present invention is to provide an organizer-type device which may be associated with or mounted on an element of a personal computer system.

Still a further purpose of the present invention is to provide an organizer of the aforementioned variety which does not require desktop surface space.

A still further purpose of the present invention is to provide an organizer apparatus which is adjustable and adaptable by the user.

BRIEF DESCRIPTION OF THE INVENTION

In accordance with the foregoing and other objects and purposes, an organizer apparatus of the present invention consists of a first vertical panel which may be preferably affixed to, for example, a side of a computer monitor. The outward-lying surface of the panel is provided with a plurality of mounting means for containers, hooks, clips and the like which may be arrayed as desired upon the panel to accommodate a variety of small items. Mounted to the first panel is a swivel arm, to which is mounted a second panel. The second panel has front and rear surfaces, each bearing a plurality of mounting means to accept additional containers and hooks and the like arrayed as desired thereupon. The arm assembly pivots about a first vertical axis, and the second panel rotates about the arm about a second vertical axis, to allow great flexibility in positioning the second panel as desired.

BRIEF DESCRIPTION OF THE DRAWINGS

A fuller understanding of the present invention and the features and advantages attendant thereto, will be accomplished upon consideration of the following detailed description of a preferred, but nonetheless illustrative embodiment of the invention, when taken in conjunction with the annexed drawings, wherein:

FIG. 1 is an elevation view of the invention mounted to a computer monitor depicting the arrangement of the first and second panels;

FIG. 2 is a top plan view of the invention;

FIG. 3 is a top plan view of the invention depicting rotation and repositioning of the arm and second panel;

DETAILED DESCRIPTION OF THE INVENTION

Figure 4:
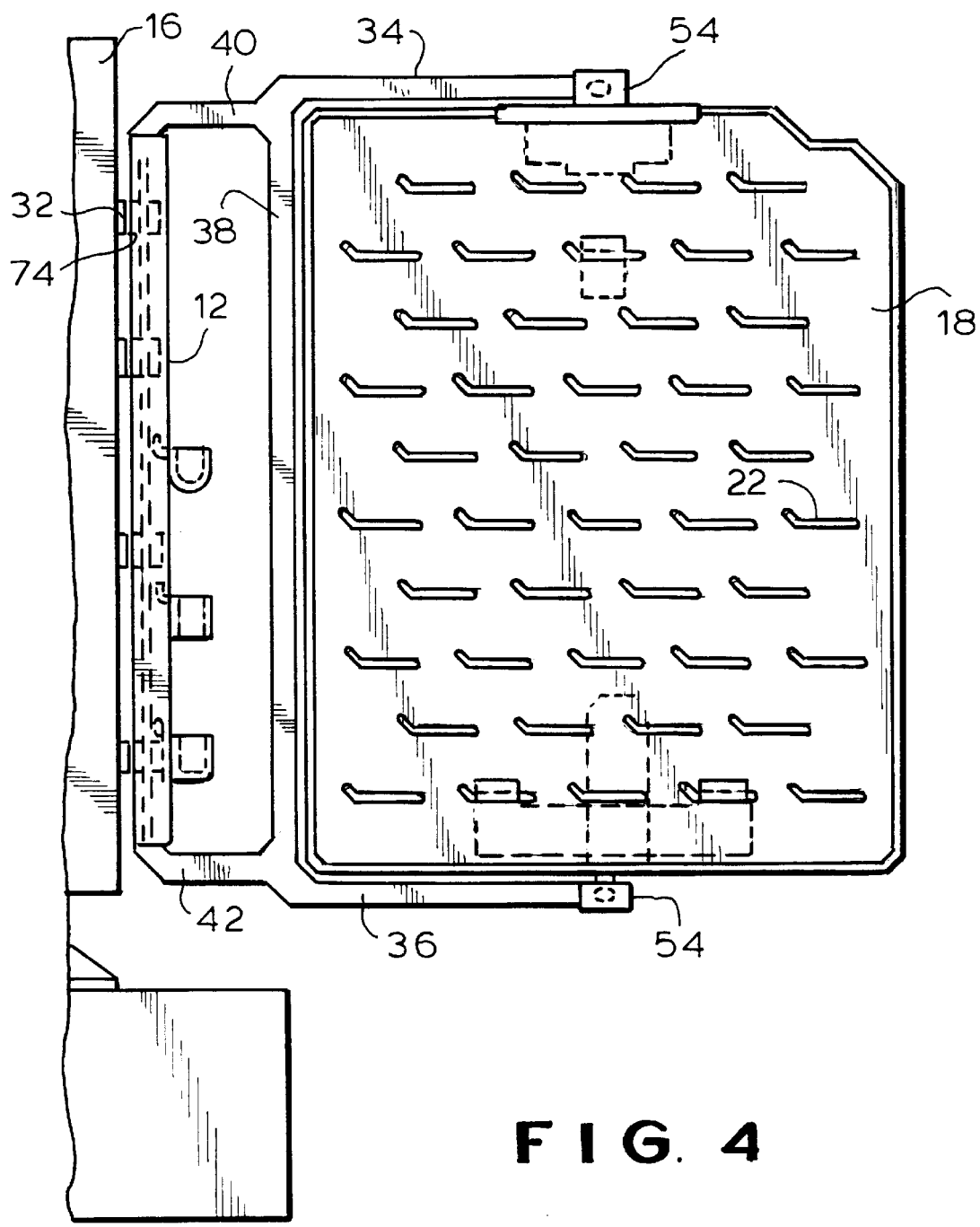
FIG. 4 is an elevation view looking along line 4—4 of FIG. 3.

With reference to the Figures, an organizer apparatus 10 constructed in accordance with the present invention comprises a first panel 12, adapted to be mounted to a generally flat vertical surface, such as the side 14 of a computer monitor 16, and a second panel 18 connected to the first panel 12 by an arm assembly 20. Each of the panels is provided with an array of mounting means 22 to which a plurality of receptacles, clips and the like, such as tray cup and ring set 24 or cup/ring 26, (collectively display and storage elements) may be mounted. The mounting means 22 are so arrayed across the panels as to provide substantial flexibility in the choice and arrangement of elements to be mounted thereon.

With particular reference to FIGS. 1, 2, 4 and 6, first panel 12 may be rectangular in elevation with an outwardly-directed, generally planar first face surface 28, surrounded by a peripheral frame or border 30. The rear face of first panel 12 may bear a plurality of horizontally-extending cross-members 74. The panel, along with the other elements of the apparatus may be formed of an appropriate plastic, molded or otherwise constructed in a known fashion. The cross-members 74 of panel 12, are provided with means for affixing the panel and apparatus 10 to an appropriate surface. As depicted the fastening means may be an adhesive layer 32 which may be formed in conjunction with a pliable substrate and may be covered with a release sheet to protect the adhesive prior to installation, to allow the panel and apparatus to be press-mounted against the receiving surface, such as the side 14 of the computer monitor 16. Other mounting means as known in the art may alternatively be used as dictated by the surface to which the panel is to be mounted.

Arm assembly 20 joins first panel 12 and second panel 18. As may be seen in FIGS. 1 and 4, the arm assembly takes a generally U-shaped form, with upper and lower horizontally-extending arms 34, 36 joined by vertical intermediate element 38 and, through secondary horizontal portions 40, 42, distal vertical element 44. The arm assembly 20, with second panel 18 is mounted thereto, can pivot about distal vertical element 44, which is rod-like and extends through the cross-members 74 as may be seen in FIG. 6. Distal vertical element 44 is formed with a pair of integral bosses or shoulders 48 which provide bearing surfaces against the top and bottom of first panel 12 and prevent vertical movement of the arm assembly with respect thereto. As depicted in FIGS. 1–4 the arm assembly and second panel mounted thereon may thus rotate in an arcuate manner about the vertical axis defined by the distal arm.

Second panel 18 is mounted to the opposite ends of the upper and lower arms 34, 36. The panel may be generally rectangular in elevation with front and rear planar parallel mounting surfaces surrounded by rigidifying frame or border 50. Means are provided at the top and bottom of the panel to mount the panel to the arm assembly and to permit rotation of the panel. First and second balls 52, 82 extend from the top and bottom edges, and engage corresponding sockets 54 at the ends of the lower and upper arms. So connected, the second panel is capable of 360° rotation about a common axis formed by the ball and socket joints. The combination of such rotational motion and the pivoting of the arm assembly allows great flexibility in locating the second panel as desired for use, display and storage as desired by the user.

Figure 7:
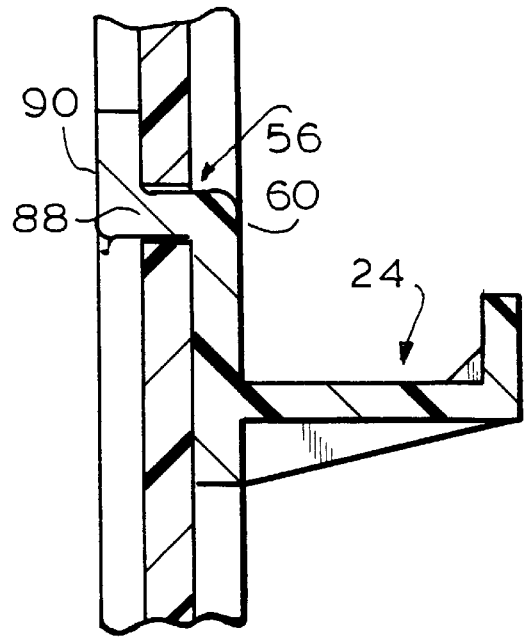
FIG. 7 is a partial elevation view in section taken along line 7—7 of FIG. 1.
Figure 6:
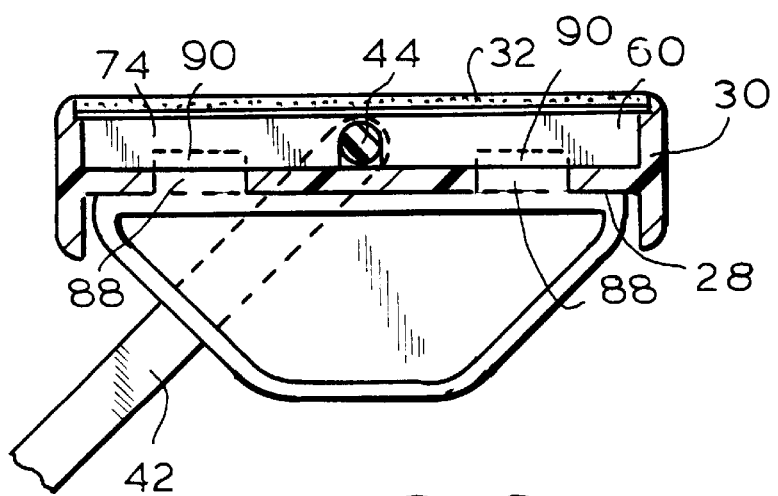
FIG. 6 is a partial plan view taken in section along line 6—6 of FIG. 1.

Both the first and second panels are provided with mounting means 22, which may be in the form of horizontally-extending slots 56 with upturned end portions 58. As shown in the Figures, the slots may be arrayed in a regular pattern across the panel surfaces. A plurality of receptacles, clips and the like, as exemplified by cup 24, hook 86 and cup/retainer loop 26, forming a pen and pencil holder, are provided with one or more mating rear tabs 60, as may be best seen in FIGS. 6 and 7, which are adapted to be inserted in and therefore engage the slots 56 to provide a mount for the storage element. As seen in FIG. 7, each tab 60 may include a horizontal portion 88 which projects through the slot 56 and upwardly-extending end portion 90 which engages the opposed face of the element through which slot 56 extends. By placing the slots 56 in a regular arrangement, a plurality of individual display and storage elements may be arrayed and repositioned as desired across both the front face of first panel 12, as well as both the front and rear faces of second panel 18, to provide significant flexibility in arrangement and storage capabilities. Various forms of such display and storage elements can be developed. For example, tray 100, as seen in FIG. 1, may include a removable tab 102 which attaches to a front ledge of the tray and provides for additional height to support items thereon.

Figure 5:
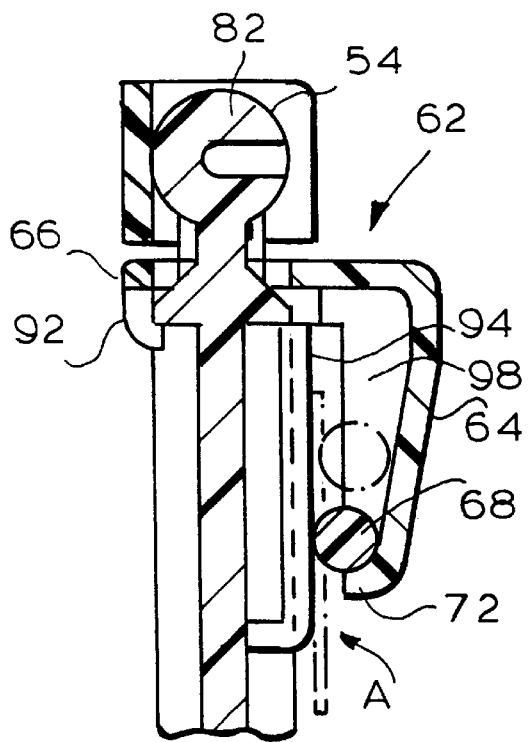
FIG. 5 is a partial elevation view taken in section along line 5—5 of FIG. 1.

Second panel 18 may be further provided with an upper clip unit 62 to allow sheet-like materials to be removably mounted to the panel. As perhaps best seen in FIGS. 1 and 5, the clip 62 includes a pair of arms 64 projecting from base portion 66 which clamps over a portion of the frame or border for the panel through feet 92, 94. The arms slant downwardly towards the front feet 94. A cylindrical gripper element 68 is positioned between the front foot 94 and the arms 64 and maintained therebetween by the lower lip 72 of the clip arms. A sheet to be retained by the clip is inserted in the direction depicted by arrow "A" in FIG. 5, the gripper element 68 moving up slightly to accommodate the leading edge of the sheet within the chamber area 98 between the arms 64 and leg 94, as indicated in phantom in FIG. 5. With the sheet inserted the gripper, under the influence of gravity, returns to a lower position, securing the sheet between the gripper and leg 94.

It is to be recognized that modifications and adaptations to the invention as particularly described herein are capable of being implemented without departing from the scope of the invention.

I claim:

1. An organizer apparatus, comprising first and second panels of each having at least one face for mounting display and storage elements thereon, said first panel having a second face bearing mounting means for the organizer, and an arm assembly pivotally joining said first and second panels.

2. The organizer apparatus of claim 1 further comprising mounting means arrayed across said at least one face of said first and second panels for the mounting of display and storage elements.

3. The organizer apparatus of claim 2, wherein said mounting means comprise a plurality of slots adapted to accept mounting tabs of the display and storage elements.

4. The organizer apparatus of claim 1, wherein said mounting means comprise an adhesive.

5. The organizer of claim 1, wherein said arm assembly comprises a generally U-shaped assembly having upper and lower arms to which said second panel is pivotally mounted and at least one vertical member between said arms.

6. The organizer apparatus of claim 5 wherein said at least one vertical member comprises a rod-like member journaled to said first panel for rotation of said arm assembly.

7. The organizer apparatus of claim 6, wherein said first panel has front and rear walls joined by peripheral side wall, said rod-like member being journaled through said side wall.

8. An organizer apparatus comprising first and second panels, each having at least one face bearing mounting means arrayed there-across, said first panel having a second face for affixing said organizer apparatus to a mounting surface; at least one display and storage element having complementary mounting means for interconnection with a chosen face mounting means to permit the display and storage element to be located as desired upon said faces; and an arm assembly pivotally joining said first and second panels.

\* \* \* \* \*